Figure 1:
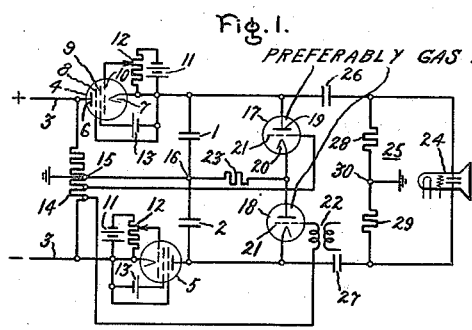

Feb. 11, 1941.           H. W. PIEPLOW           2,231,591
                    ELECTRIC VALVE CIRCUIT
                     Filed May 19, 1938

Inventor:
Hans W. Pieplow,
by Harry E. Dunham
His Attorney.

Patented Feb. 11, 1941

2,231,591

UNITED STATES PATENT OFFICE 2,231,591

ELECTRIC VALVE CIRCUIT

Hans Werner Pieplow, Berlin, Germany, assignor to General Electric Company, a corporation of New York Application May 19, 1938, Serial No. 208,941
In Germany June 29, 1937

4 Claims. (Cl. 250—36)

My invention relates to electric valve circuits and more particularly to electric valve circuits for producing periodic electrical quantities.

In many applications it is desirable to impress upon a load device a periodic voltage of symmetrical wave form. For example, in circuits for energizing the deflecting plates of cathode ray oscillographs, it is important to produce timing or sweep voltages of symmetrical wave form in order to obtain an accurate visual reproduction of an electrical quantity or other phenomenon to be studied. Furthermore, in circuits of this nature, it is of considerable consequence to provide arrangements in which the periodic control voltage is symmetrical with respect to ground potential. The necessity or desirability of such symmetry is emphasized when the periodic control voltages are impressed on electronic discharge devices such as Braun valves or cathode ray oscillographs. In accordance with the teachings of my invention described hereinafter, I provide new and improved control circuits which produce periodic control voltages which are of symmetrical wave form and which are symmetrical with respect to ground potential.

It is an object of my invention to provide new and improved electric valve circuits.

It is another object of my invention to provide new and improved circuits for generating periodical electrical quantities.

It is a further object of my invention to provide new and improved electric valve circuits for generating periodic electrical quantities, such as periodic voltages, for energizing the electrodes of electronic discharge devices, and which are of symmetrical wave form and which are symmetrical with respect to ground potential.

In accordance with the illustrated embodiments of my invention, I provide new and improved electric valve circuits for generating periodic control voltages which are impressed upon the electrodes of electronic discharge devices, such as the control electrodes of Braun valves or cathode ray oscillographs. A pair of serially connected capacitances are charged in series relation from a direct current source through electric valve means of the high vacuum type, so that the charging rate of the capacitances is substantially constant. A voltage divider is connected across the direct current source and the common juncture of the serially connected capacitances is connected to an electrically symmetrical point of the voltage divider. Electric valve means, preferably of the type employing an ionizable medium, periodically discharges the capacitances to generate the periodic timing voltage. The voltage appearing across the capacitances is impressed upon the electrodes of the cathode ray oscillograph through a voltage divider or filter circuit. An electrically symmetrical point of the voltage divider associated with the Braun valve is connected to ground. The electrically symmetrically point of the voltage divider which is connected across the direct current source may also be connected to ground.

In accordance with several of the illustrated embodiments of my invention, the serially connected capacitances are charged by means of two electric valves of the high vacuum type; one of these valves is connected in series relation with the positive terminal of the direct current source and one of the capacitances, and the other electric valve is connected in series relation with the negative terminal of the direct current source and the other capacitance.

In another embodiment of my invention diagrammatically illustrated, the capacitances are charged in series relation from the direct current source and the electric valve means is connected between the capacitances. Individual means, such as electric valves, are associated with each of the capacitances to effect periodic discharge thereof. These latter valves may be of the controlled type and may be arranged so that the discharge of one of the capacitances occasions operation of the electric valve associated with the other capacitance. The load device is energized in accordance with the voltage appearing across the anode and cathode of the electric valve which is connected between the capacitances.

For a better understanding of my invention, reference may be had to the following description taken in connection with the accompanying drawing and its scope will be pointed out in the appended claims.

Figure 2:
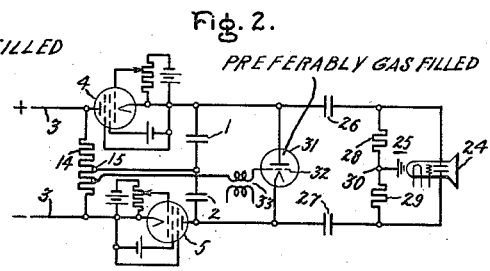
Figure 4:
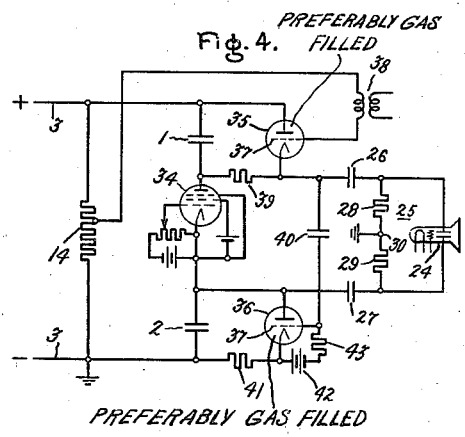

Fig. 1 of the drawing diagrammatically illustrates one embodiment of my invention in which serially connected capacitances are charged through electric valve means from a direct current source and in which a pair of electric valves discharge the capacitances periodically. Fig. 2 is an arrangement similar to that shown in Fig. 1 with the exception that a single electric valve discharges the capacitances periodically. Fig. 4 illustrates a still further embodiment of my invention in which the serially connected capacitances are charged by means of an electric valve connected between the capacitances. Fig.

3 represents certain operating characteristics of the arrangement shown in Fig. 4.

Referring now to Fig. 1, my invention is diagrammatically illustrated as applied to an electric valve circuit for generating a periodic electrical quantity, such as a periodic control voltage. A pair of serially connected capacitances 1 and 2 are connected to be charged from a direct current source 3 through electric valve means 4 and 5. Electric valve means 4 and 5 are preferably of the high vacuum type and may be pentodes, that is electric valves having an anode 6, a cathode 7, a suppressor grid 8, a screen grid 9 and a control grid 10. The electric valves 4 and 5 are excited so that these valves operate within the saturated region, that is, so that the electric valves transmit a substantially constant current to assure a constant charging rate for the capacitances 1 and 2. A suitable source of voltage, such as a battery 11 and a voltage divider 12, may be employed to adjust the voltage impressed on the control grid 10, and a suitable source of voltage, such as a battery 13, may be employed to impress upon the screen grid 9 a suitable positive voltage relative to the cathode.

A voltage divider comprising a resistance 14 is connected across the direct current source 3 and is provided with an electrically symmetrical connection 15 which may be connected to ground. The connection 15 is connected to the common juncture 16 of the serially connected capacitances 1 and 2.

To periodically discharge the capacitances 1 and 2 to generate the periodic control voltage, I provide a pair of individual means such as electric valves 17 and 18 which are preferably of the type employing an ionizable medium such as a gas or a vapor. Each of the electric valves 17 and 18 comprises an anode 19, a cathode 20, and a control member or grid 21. The electric valve 18 is periodically rendered conductive by means of a resultant control voltage which is impressed on the grid 21 through a transformer 22. The secondary winding of the transformer 22 is connected to a point on the resistance 14 of the voltage divider. To control the electric valve 17 so that it follows the electric valve 18, that is, to render the electric valve 17 conductive immediately after the electric valve 18 is rendered conductive, I provide a suitable impedance element, such as a resistance 23, which is connected between the common juncture 16 of capacitances 1 and 2 and the common juncture of electric valves 17 and 18.

The periodic control voltage generated by the electric valve circuit is impressed on the electrodes of a load device, such as a Braun valve or a cathode ray oscillograph 24, through a bridge or filter circuit 25. The bridge or filter circuit 25 includes a pair of blocking condensers 26 and 27 and a pair of serially connected impedance elements such as resistances 28 and 29, the common juncture 30 of which is connected to ground potential. Since an electrically symmetrical point of the filter circuit 25 is connected to ground and since an electrically symmetrical point of the voltage divider including resistance 14 is connected to ground, the wave form of the voltage impressed across the electrodes of the valve 24 will be symmetrical with respect to ground potential.

The operation of the embodiment of my invention illustrated in Fig. 1 will be explained by considering the system when it is operating to generate a periodic voltage which is impressed across the electrodes of valve 24. Since the electric valves 4 and 5 are excited to transmit a substantially constant current, the condensers 1 and 2 are charged in series relation from the direct current source 3 at a substantially constant rate so that the voltage appearing across the terminals of these capacitances varies linearly. Furthermore, since an electrically symmetrical connection of the resistance 14 is connected to ground and since an electrically symmetrical connection of the filter circuit 25 is connected to ground, the voltage drop appearing across the electric valves 4 and 5 will be maintained substantially constant irrespective of slight variations in the magnitude of the control voltage impressed on the control grids 10. The capacitances 1 and 2 are periodically discharged by the electric valves 17 and 18. Electric valve 18 is rendered conductive by means of the resultant periodic voltage impressed on the grid 21 thereof. The periodic voltage impressed thereon is a resultant of at least two components, one of which is a periodic component derived from the voltage divider including resistance 14, and the other of which is a component produced by the transformer 22. Where it is desired to obtain a desired synchronization between the periodic control voltage produced by the system and the voltage of an associated alternating current circuit, the transformer 22 may be energized in a manner to secure such synchronization. When the electric valve 18 is rendered conductive, the capacitance 2 is discharged through a circuit including resistance 23 and electric valve 18. Due to the discharge of the capacitance 2, there appears across the terminals of the resistance 23 a voltage which tends to raise the potential of the grid 21 of electric valve 17 momentarily positive with respect to the potential of the cathode 20 so that the electric valve 17 is also rendered conductive. After the electric valve 17 is rendered conductive, the capacitance 1 is also discharged. It is to be understood that the time delay between the initiation of the discharges of capacitances 1 and 2 is very slight so that the discharges are substantially coincident and the times of initiation of the discharges are substantially coincident.

The filter circuit 25 serves to suppress the unidirectional component of voltage so that the voltage impressed across the electrodes of electric valve 24 is of symmetrical wave form. More specifically, the capacitances 26 and 27 serve to suppress the unidirectional component of voltage. In addition, since the electrically symmetrical point 30 is connected to ground potential, the wave form of the control voltage is also symmetrical with respect to ground potential, permitting thereby an accurate and precise reproduction of the electrical quantity to be studied without involving discrepancies occasioned by charges which would otherwise accumulate on the electrodes of the electric valve 24 due to any dissymmetry causing unequal swings in the control voltage.

Fig. 2 diagrammatically illustrates another embodiment of my invention which is similar in many respects to the embodiment shown in Fig. 1 and corresponding elements have been assigned like reference numerals. Instead of employing two electric valves for discharging the capacitances 1 and 2, as is shown in Fig. 1, in the arrangement of Fig. 2 a single electric valve 31 is connected across the capacitances 1 and 2 and periodically discharges these capacitances. The electric valve 31 is preferably of the type employing an ionizable medium and includes a control member or grid 32. The transformer 33 may be connected to the grid 32 and may be energized from a suitable source of alternating current or periodic voltage to effect a desired synchronization between the periodic control voltage produced by the system and the voltage of an associated circuit.

The operation of the embodiment of my invention shown in Fig. 2 is substantially the same as that of Fig. 1. The capacitances 1 and 2 are charged at a substantially constant rate from the direct current source 3 by electric valves 4 and 5. Electric valve 31 periodically discharges the capacitances 1 and 2 in series relation to generate the periodic control voltage which is impressed across the electrodes of the electric valve 24 or filter circuit 25. The filter circuit 25, due to the connection of the electrically symmetrical point 30 to ground, assures that the voltages impressed across the electrodes of electric valve 4 are symmetrical with respect to the positive and negative portions thereof, and is also symmetrical with respect to ground potential. It will be noted that this symmetry is obtained even though the resistance 14 of the voltage divider is not connected to ground.

Figure 3:
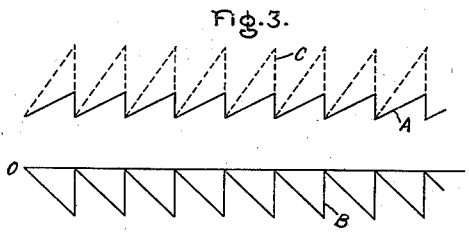

The operating characteristics represented in Fig. 3 may be considered to explain further the operation of the embodiment of my invention shown in Fig. 2. Curve A represents the voltage appearing across the terminals of capacitance 1, and curve B represents the voltage appearing across the terminals of capacitance 2. Curve C, which is the resultant of these curves, represents the resultant voltage appearing across the terminals of capacitances 1 and 2. It will be noted that the resultant voltage is displaced relative to the zero axis by a constant amount. This unidirectional displacement is, of course, suppressed by means of control circuit 25 so that only the symmetrical periodic timing voltage is impressed upon the electrodes of the electric valve 24.

In Fig. 4 of the drawing there is diagrammatically illustrated another embodiment of my invention in which the capacitances 1 and 2 are charged in series relation from the direct current circuit 3 through a single electric valve 34 which is preferably of the high vacuum type. The electric valve 34 is similar in construction and arrangement to the electric valves 4 and 5 discussed above in connection with Figs. 1 and 2. The electric valve 34 is connected between the capacitances 1 and 2 and charges these capacitances at a substantially constant rate. Individual means, such as separate electric valves 35 and 36, are associated with the capacitances 1 and 2, respectively, and periodically discharge these capacitances to generate a periodic control voltage. These valves are of the type employing an ionizable medium and each includes a control grid 37. The electric valve 24 is energized in accordance with the voltage appearing across the anode and cathode of the electric valve 34. Electric valve 35 is rendered conductive periodically by means of a resultant periodic voltage which is impressed on control grid 37. For synchronization purposes, a transformer 38 may be employed to introduce a synchronizing voltage into the control circuit for electric valve 35. In order to impress a suitable voltage on control grid 37 of electric valve 36 to render this valve conductive immediately after the initiation of the discharge of capacitance 1 by electric valve 35, I provide a suitable circuit including a resistance element 39 and a capacitance 40 which impress a transient positive voltage on the control grid 37 of electric valve 36. A suitable impedance element, such as a resistance 41, may be connected in series relation with the electric valve 36 to control the rate of discharge of the capacitance 2. To impress on control grid 37 of electric valve 36 a negative unidirectional biasing potential, I employ a circuit including a battery 42 and a current limiting resistance 43.

The embodiment of my invention shown in Fig. 4 operates to generate a periodic control voltage which is of symmetrical wave form relative to the positive and negative portions thereof and which is also symmetrical with respect to ground potential. The capacitances 1 and 2 are charged at a substantially constant rate from the direct current source 3 through electric valve 34. The voltage appearing across the electric valve 34, therefore, varies linearly. Electric valve 35 is rendered conductive periodically by the composite effect of the voltage derived from the voltage divider 14 and the synchronizing voltage produced by transformer 38. Upon being rendered conductive, the electric valve 35 effects discharge of the capacitance 1 through a circuit including electric valve 35 and resistance 39. Due to the conduction of the discharge current through the resistance 39, a positive impulse of voltage is impressed on the control grid 37 of electric valve 36 through capacitance 40. Electric valve 36 is thereby rendered conductive, effecting discharge of the capacitance 2 through electric valve 36 and resistance 41. The discharges of the capacitances 1 and 2 are initiated substantially simultaneously so that the periodic voltage produced by the system is of the desired symmetrical wave shape. Filter circuit 25 suppresses the unidirectional components of voltage so that only the periodic component is impressed across the electrodes of electric valve 24. Since an electrically symmetrical point is connected to ground, the wave form of the periodic voltage is also symmetrical with respect to ground potential.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of direct current, a pair of serially connected capacitances connected to be charged in series relation from said direct current source, a single electric valve means connected between said capacitances to effect charge of said capacitances from said source, a pair of electric valves each connected across a different one of said capacitances for effecting periodic discharge thereof, means for rendering one of said pair of electric valves conductive periodically, and means responsive to the operation of one of said electric valves to render the other electric valve conductive.

2. In combination, a source of direct current having a terminal at ground potential, a load device, a pair of serially connected capacitances, electric valve means connected between said capacitances and having an anode and a cathode for charging said capacitances in series relation from said source, a pair of electronic discharge devices each connected across a different one of said capacitances for periodically discharging said capacitances, means for energizing said load device in accordance with the anode-cathode voltage of said electric valve means, means responsive to the operation of one of said discharge devices to render the other discharge device conductive, and a voltage divider connected across said load device and having a point thereof at the potential of said one terminal of the direct current source so that the voltage impressed across said load device is of symmetrical wave form with respect to ground potential.

3. In combination, a source of direct current, a pair of serially connected capacitances, electric valve means having an anode and a cathode and being connected between said capacitances for charging said capacitances in series relation from the direct current source, a pair of electric valves each connected to a different one of said capacitances for effecting periodic discharge thereof, means responsive to the operation of one of said pair of electric valves to render the other electric valve conductive, and a load device connected across the anode and cathode of the first mentioned electric valve means.

4. In combination, a source of direct current, a pair of serially connected capacitances, a single electric valve means connected between said capacitances for charging said capacitances in series relation from said source, a pair of electric valves each connected across a different one of said capacitances for effecting periodic discharge thereof, each of said pair of electric valves comprising a control member for initiating operation thereof, means for impressing a periodic voltage on the control member of one of said electric valves, and means responsive to the conduction of current by said one of said electric valves for initiating operation of the other of said electric valves.

HANS W. PIEPLOW.